US010278367B2

(12) United States Patent
Waymouth

(10) Patent No.: US 10,278,367 B2
(45) Date of Patent: May 7, 2019

(54) INTERACTIVE TRACKING, MONITORING, AND REPORTING PLATFORM FOR DOMESTICATED ANIMALS

(71) Applicant: PetSimpl Inc., Northhampton, MA (US)

(72) Inventor: David Waymouth, Northhampton, MA (US)

(73) Assignee: PETSIMPL INC., Northhampton, MA (US)

( * ) Notice: Subject to any disclaimer, the term of this patent is extended or adjusted under 35 U.S.C. 154(b) by 162 days.

(21) Appl. No.: 14/824,789

(22) Filed: Aug. 12, 2015

(65) Prior Publication Data
US 2016/0044897 A1 Feb. 18, 2016

Related U.S. Application Data

(60) Provisional application No. 62/036,808, filed on Aug. 13, 2014.

(51) Int. Cl.
A01K 29/00 (2006.01)

(52) U.S. Cl.
CPC ................... *A01K 29/005* (2013.01)

(58) Field of Classification Search
CPC .................................................. A01K 29/005
USPC ....................................................... 340/573.3
See application file for complete search history.

(56) References Cited

U.S. PATENT DOCUMENTS

| 9,737,049 B2 * | 8/2017 | Trottier ..................... A01K 5/02 |
| 2004/0154831 A1 * | 8/2004 | Seydoux ................... E21B 7/04 |
| | | 175/24 |
| 2010/0263596 A1 * | 10/2010 | Schumann ........... A01K 5/0114 |
| | | 119/51.02 |
| 2013/0192526 A1 * | 8/2013 | Mainini ............... A01K 15/021 |
| | | 119/51.02 |
| 2015/0163412 A1 * | 6/2015 | Holley ................... G05B 15/02 |
| | | 348/143 |
| 2015/0373951 A1 * | 12/2015 | Kelly ................... A01K 15/021 |
| | | 119/719 |
| 2016/0248972 A1 * | 8/2016 | Garrison ............ H04N 5/23238 |

FOREIGN PATENT DOCUMENTS

WO WO 2010/077286 A1 * 7/2010
WO WO 2016/010906 A1 * 1/2016

* cited by examiner

*Primary Examiner* — Nader Bolourchi

(74) *Attorney, Agent, or Firm* — Bekiares Eliezer LLP

(57) ABSTRACT

An interactive tracking, monitoring, and reporting platform of domesticated animal activity may be provided. The platform may enable the tracking of domesticated animals within an interactive tracking zone. The tracking activity may be controlled by a rule set defined by the owner and enabled by a tracking device embodied as, for example, a collar worn by the animal. Upon the tracking device's proximal location to detection devices within the interactive tracking zone, an action may be triggered. The trigger may cause an action to be taken by, for example, a device located within the interactive tracking zone. The trigger may cause information to be collected on the domesticated animal's activity by the platform. The platform may then provide a report on the domesticated animal's activity to the domesticated animal's owner. The report may be communicated via a mobile phone application and may comprise real-time data collected on the domesticated animal.

5 Claims, 5 Drawing Sheets

INTERACTIVE TRACKING, MONITORING, AND REPORTING PLATFORM FOR DOMESTICATED ANIMALS

RELATED APPLICATION

Under provisions of 35 U.S.C. § 119(e), the Applicant claims the benefit of U.S. provisional application No. 62/036,808, filed Aug. 13, 2014, which is incorporated herein by reference.

It is intended that the referenced application may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to a centralized system, method, and apparatus for domesticated animal monitoring and care taking.

BACKGROUND

The domestication of animals (hereinafter referred to as "pets," such as, for example, but not limited to, dogs and cats) has presented many challenges for pet owners. It is well known that dogs need to be fed and walked regularly, while cats can be hard to follow. Ensuring, however, that a pet is timely fed, walked, and monitored can be difficult with a pet owner's busy, out-of-home schedule. Conventional technology has provided some advancements to assist pet owners.

For example, using conventional technology that monitor a pet's location, pet owners may receive alerts when their pet has left a predetermined area or perimeter. Moreover, conventional technology has been integrated with pet doors to automatically unlock upon detection of a device, which may be attached to a pet collar, in proximity thereto. In this way, the pet may freely roam to-and-from the home while the pet door is maintained in a preset, locked position.

Although these advancements do assist pet owners in various ways, conventional technology fails to address the problems solved by the present disclosure.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Embodiments of the present disclosure provide a platform for interactive tracking, monitoring, and reporting domesticated animal activity to its owner. The platform may enable the tracking of domesticated animals within an interactive tracking zone. The tracking activity may be controlled by a rule set defined by the owner and enabled by a tracking device embodied as, for example, a collar worn by the animal. Upon the tracking device's proximal location to detection devices within the interactive tracking zone, an action may be triggered. In some embodiments, the trigger may cause an action to be taken by, for example, a device located within the interactive tracking zone (e.g., pet-food dispenser). In further embodiments, the trigger may cause information to be collected on the domesticated animal's activity by the platform. The platform may then provide a report on the domesticated animal's activity to the domesticated animal's owner. The report may be communicated via, for example, a mobile phone application and may comprise real-time data collected on the domesticated animal. In various embodiments, a plurality of caretakers of the domesticated animal can access the platform in the same way an owner of the domesticated animal would.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
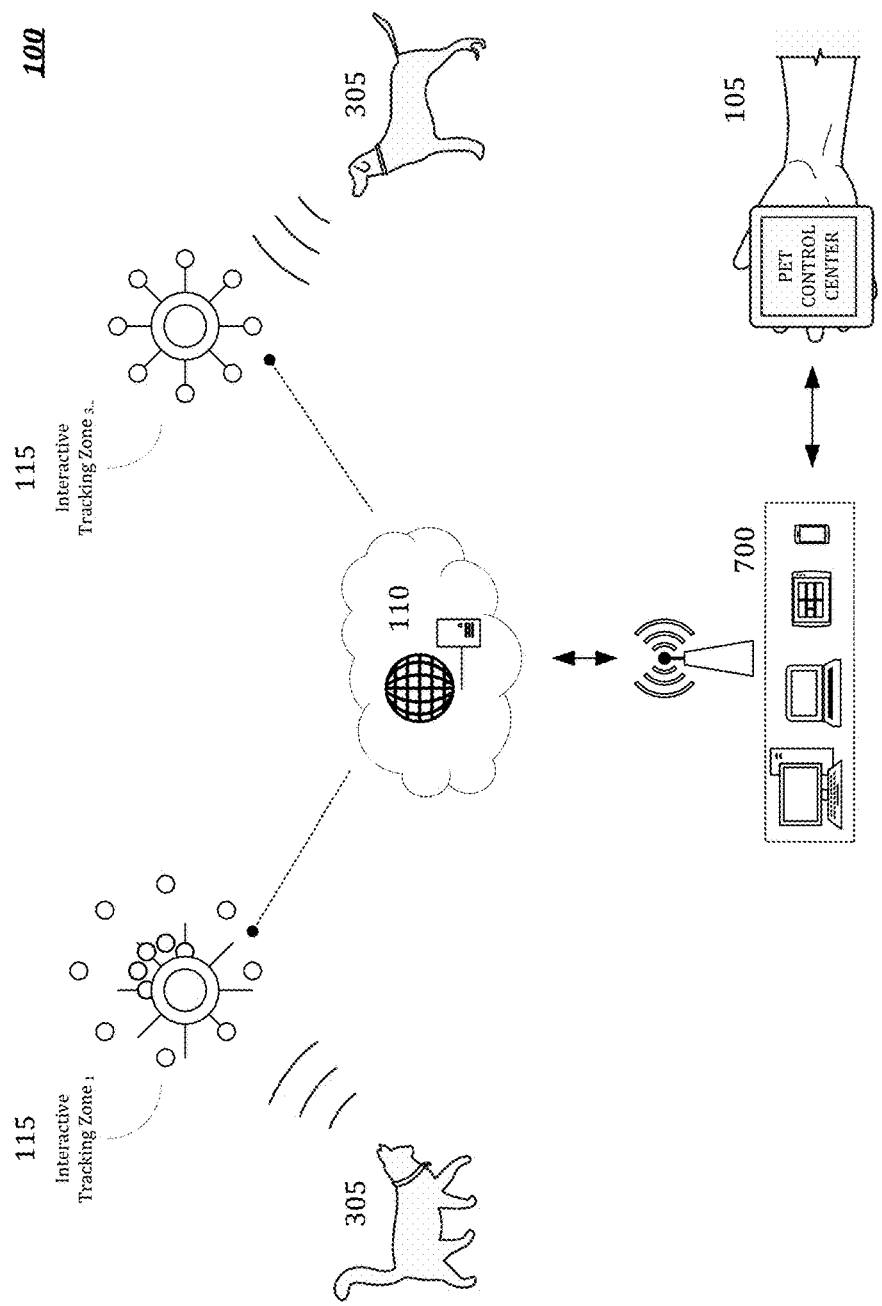
FIG. 1 is one operating environment for providing embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of domesticated animal care and monitoring, embodiments of the present disclosure are not limited to use only in this context.

I. Platform Overview

Consistent with embodiments of the present disclosure, an interactive tracking, monitoring, and reporting platform for domesticated animals may be provided. This overview is provided to introduce a selection of concepts in a simplified form that are further described below. This overview is not intended to identify key features or essential features of the claimed subject matter. Nor is this overview intended to be used to limit the claimed subject matter's scope.

FIG. 1 illustrates an operating environment for providing a centralized domesticated animal (i.e., a "pet") monitoring platform 100. As will be detailed below, a pet 305 may be outfitted with an interactive apparatus. The apparatus may be embodied as, for example, but not limited to, a device worn on a collar, or in some embodiments, an integrated collar worn by pet 305. The apparatus may be configured to be in bi-directional communication within an interactive tracking zone, illustrated as interactive zones $115_{1-N+}$. Interactive zoning is further detailed with reference to FIGS. 3-4.

The apparatus worn by pet 305 may be configured to interact with various elements within the tracking zone, such as, for example, but not limited to food and beverage dispensers and pet-doors. In some embodiments, each of the various elements may be configured to be associated with its own tracking zone. For example, a food dispenser may be associated with one tracking zone, while a pet door may be associated with another tracking zone. Intra-zone element interaction is further detailed with reference to FIGS. 5-6. Upon detecting an interaction with various intra-zone elements, the apparatus may be configured to transmit data to a network server 110. In turn, network server 110 may be configured to log the interaction and compile data pertaining to pet 305's interaction with intra-zone elements.

Still consistent with embodiments of the present disclosure, the apparatus may be configured with location detection components. The location detection components may be enabled to communicate the location of pet 305 to network server 110. In turn, network server 110 may be configured to log the location and compile data pertaining to pet 305's location.

Network server 110's compiled data may be provided to a user 105. The user may access the compiled data through a user interface (UI) embodied as, for example, but not limited to a web or mobile application. The web or mobile application may be accessed by on a computing device 700 (e.g., desktop, laptop, tablet, or smartphone), which will be described in greater detail with reference to FIG. 7.

The UI may provide user 105 with information regarding to pet 305. For instance, user 305 may be enabled, but not limited to, for example, view pet 305's location, monitor its activities (e.g., via intra-zone element interaction data), set interaction rules for intra-zone elements, send commands to pet 305's apparatus (via server 110), and receive alerts from network server 110. In this way, user 105 may be provided with a centralized platform to remotely monitor, track, and regulate pet 305's activities.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. Platform Configuration

As mentioned above, the interactive apparatus worn by pet 305 may be worn as a collar. The collar may comprise a housing for storing a plurality of electronic components. The components may comprise, but not be limited to, at least one of the following: a processing unit (e.g., FPGA/SOC), a memory storage, a communications module, a location and movement module, an input module, an output module, a plurality of sensing devices, and a power supply (e.g., a disposable or rechargeable battery). In some embodiments, the apparatus, or portions thereof, may be tied to pet 305 by other means, such, but not limited to, modules surgically placed within the body of pet 305.

The sensing devices of the apparatus may comprise, for example, radio-frequency identification (RFID), near field communication (NFC) devices, and/or Bluetooth components. Similarly, intra-zone interactive elements (e.g., food/beverage dispensers, doors, toys) may be configured with similar sensors so as to be in operative communication with the apparatus when the apparatus is within sufficient proximity to the interactive elements. The configuration of interactive elements within the zone so as to be remotely controlled may be readily available to one of ordinary skill in the field of the present disclosure.

The sensing devices of the apparatus may be configured to signal the processing unit of the apparatus upon a detection of interaction with the sensing devices of the interactive elements. The processing unit may be coupled to the memory storage which may comprise a set of instructions for acting upon a received signal from the sensors. The instructions may enable the processing unit to trigger, for example, a microphone, a speaker, and/or a video camera ("A/V elements"). These A/V may be configured within the apparatus itself, or, in some embodiments, within an interactive zone in which the apparatus is located.

Still consistent with embodiments of the present disclosure, the instructions may enable the processing unit to issue a signal to network server 110. The signal may be communicated via the communications module. Communications module may comprise network components such as, but not limited to, Wi-Fi, Bluetooth, or 2G/3G/4G telecommunications elements. In this way, the communications module may be used to interface with network server 110.

Upon receiving a signal from the apparatus, network server 110 may determine what operation to perform based on the type of signal received. The operation may be, for example, a triggering of the above-mentioned A/V elements. Thus, network server 110 may accordingly communicate a triggering signal to be received and processed by the apparatus. Or, if the triggered element is not configured on the apparatus itself (e.g., external A/V element, food/beverage dispenser, automated pet door), network server 110 may communicate the signal directly to an intra-zone interactive element in operative communication with the triggered element. In this scenario, the interactive element may be configured with a communications module and a processing unit for operating the triggered element in accordance to, for example, signals received from network server 110. Examples of such bi-directional communication between the apparatus, network server 110, and intra-zone elements will be further detailed below with reference to FIGS. 3-6.

Consistent with embodiments of the present disclosure, the apparatus may further comprise a location and movement detection module. The module may comprise, for example, global positioning system (GPS) elements in communication with a GPS satellite, which, in turn, may communicate pet 305's location with network server 110. The module may further comprise, for example, an accelerometer for detecting the movements of pet 305. The detected information may then be communicated to network server 110. Energy saving aspects of the location and movement detection module will be detailed with reference to FIGS. 3-4 below.

Furthermore, in some embodiments, the location of pet 305 may be determined not by the location and movement detection module, but by the other modules configured within the apparatus. For example, network server 110 may derive the location by receiving a signal from the apparatus corresponding to an interaction with an intra-zone interactive element. Then, the location of the intra-zone interactive element (e.g., within the interactive zone) may be sufficient to derive the location of the apparatus.

Similarly, sensors may be configured as passive elements throughout an interactive tracking zone. For example, RFID tags or other near field wireless beacons (e.g., Bluetooth) may be placed in each room of a home. Then, as pet 305 enters a room, the RFID tag reading may trigger the apparatus to communicate a corresponding interaction signal to network server 110. The data may be interpreted by network server 110 and the location of pet 305 may be accordingly derived. In this way, the location of the apparatus (and, therefore, the location of pet 305) may be determined by the sensing devices on the apparatus rather than the location detection components.

Having the interaction, location, and movement information of the apparatus, network server 110 may aggregate and analyze data associated with pet 305. As mentioned above, the data may be provided to user 105 via a UI. The UI may display the data as time-based reports of pet 305's activities, location, and general behavior. Moreover, in scenarios where video or microphone signals are triggered, the UI may provide a means for user 105 to receive the feeds.

The UI may further enable user 105 to set rules for pet 305's interaction with the intra-zone interactive elements. For instance, user 105 may enable interaction with a given intra-zone element between certain times of the day, while disabling interaction for other times of the day.

Still consistent with embodiments of the present disclosure, user 105 may be prompted with alerts regarding apparatus interaction. The alerts may be set by user 105 and triggered upon interaction with, for example, certain intra-zone elements. For example, if pet 305 leaves an interactive tracking zone, user 105 may be alerted via UI. In some embodiments, when the apparatus is within proximity to an interactive food dispenser, the user may be alerted to issue a command, via the UI, to dispense food. Such commands may be communicated from computing device 700 to network server 110, which may then communicate the command to the apparatus and/or corresponding interactive element. In this way, embodiments of the present disclosure may be enable user 105 to remotely monitor and control both the apparatus and the intra-zone interactive elements.

Although the present disclosure is described with reference to a single pet 305, it should be understand that platform 100 may accommodate a plurality of pets, each pet having its own set of interaction and monitoring rules for the plurality of interactive elements within an interactive zone.

III. Platform Operation

Figure 2:
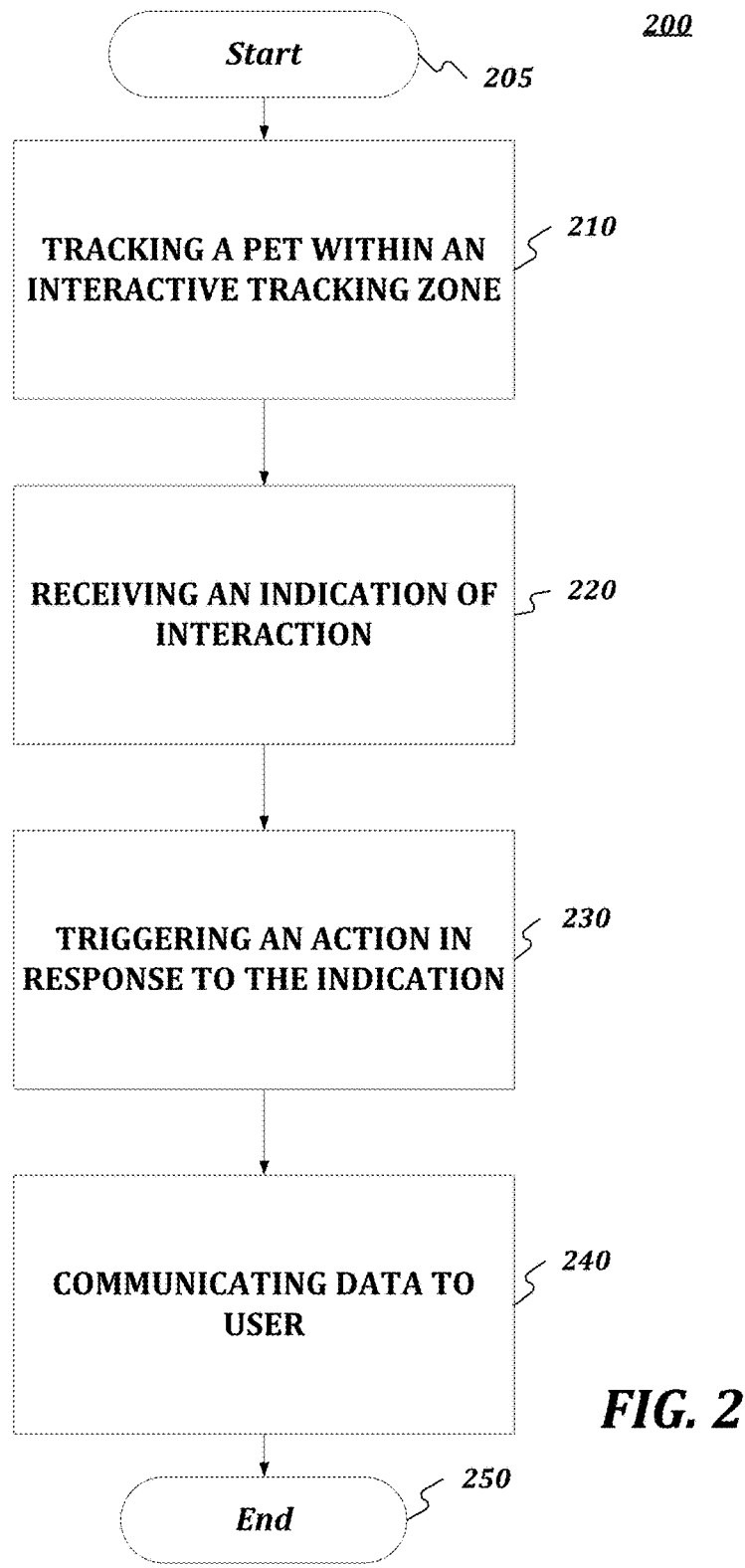
FIG. 2 is a flow chart of a method for providing embodiments of the present disclosure.

FIG. 2 is a flow chart setting forth the general stages involved in a method 200 consistent with an embodiment of the disclosure for providing a centralized domesticated animal monitoring platform. Method 200 may be implemented using a computing device 700 (e.g., server 110—which may be used interchangeably with computing device 700 throughout the disclosure) as described in more detail below with respect to FIG. 7.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 200 will be described in greater detail below.

Figure 3:
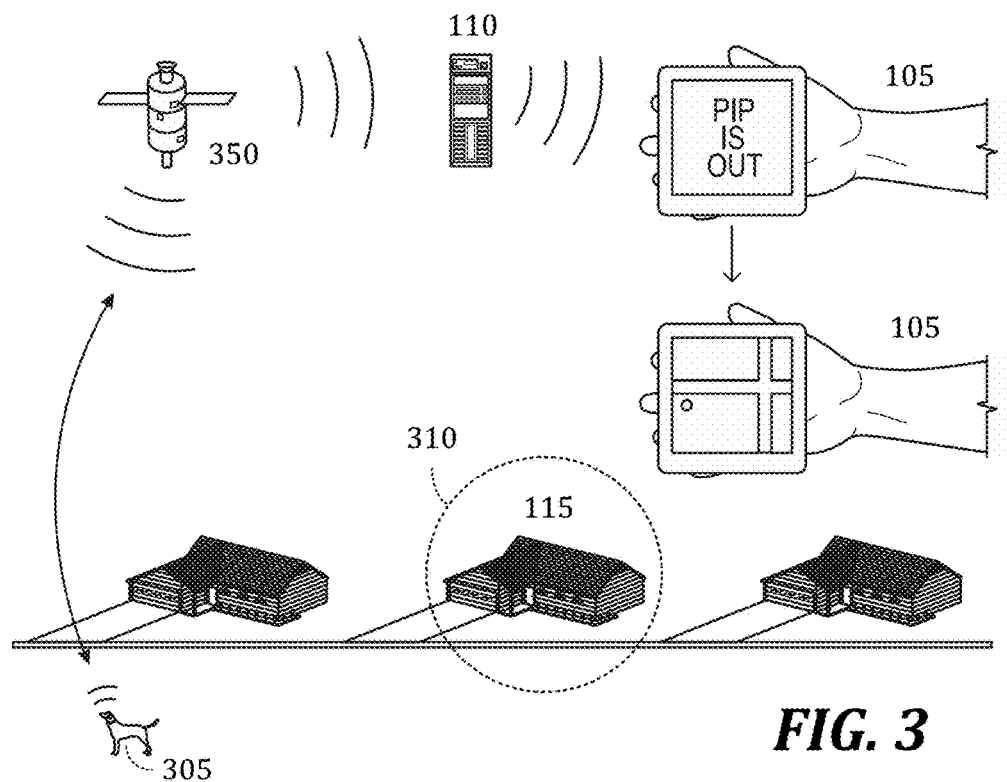
FIGS. 3-4 are diagrams illustrating interactive zones consistent with embodiments of the present disclosure.

Method 200 may begin at starting block 205 and proceed to stage 210 where computing device 700 may track pet 305 within an interactive tracking zone. FIG. 3 illustrates an interactive tracking zone 115. As shown in FIG. 3, user 105 may be enabled to establish a 'safe' zone 310.

User 105 may establish the safe zone via the UI, as described above. For example, the UI may enable user 105 to set safe zone 310 by the selection of coordinates or a region on a map. In this way, safe zone 310 may be set to correspond to a geographical region. In other embodiments, safe zone 310 may be established by a user selecting a particular Wi-Fi network as an anchor point. Then, when apparatus is connected to the Wi-Fi network, it may be determined that pet 305 is within the safe zone 310.

When it is detected that pet 305 (via its corresponding apparatus) is within safe zone 310, certain features and functionality of the apparatus may be enabled or disabled. User 105 may be enabled to set which features should be enabled or disabled. For example, user 105 may decide which intra-zone interactive elements should be enabled when pet 305 is within safe zone 310, and which alerts should be triggered upon a detection that pet 305 has left safe zone 310. As shown in FIG. 3, user 105 may receive a textual alert via the UI, followed by a display of pet 305's proximate location on a map.

Figure 4:
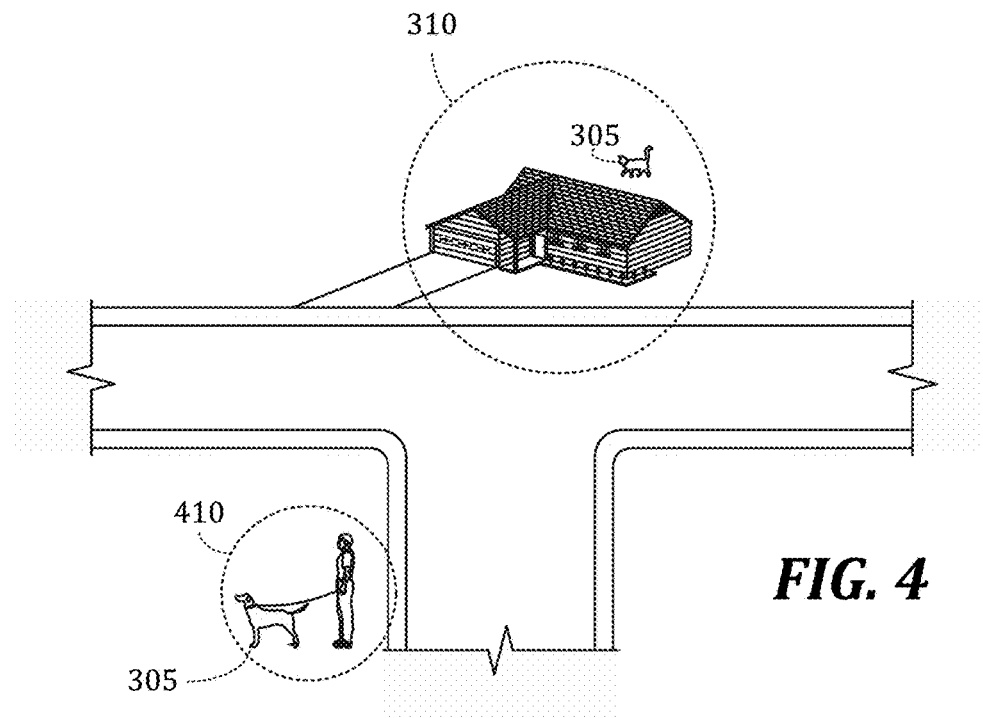

Consistent with embodiments of the present disclosure, safe zone 310 may be configured to be dynamically associated with a user rather than statically associated with a geographical region. FIG. 4 illustrates a safe zone 410 configured around an individual or any other integrated infrastructure capable of serving as an anchor for the safe zone (e.g., pet door, mailbox, back-yard, or any other integrated objects). Accordingly, in some embodiments, user 105 may be enabled to select a mobile device to serve as an anchor point. The mobile device may be configured with a mobile application consistent with embodiments of the present disclosure. In this way, when apparatus is connected to the mobile device via, for example, a Bluetooth connection, server 110 may determine that pet 305 is within safe zone 310. Accordingly, user 105 may configure a plurality of mobile devices (or other integrated objects) to serve as anchor points for safe zone creation.

Still consistent with embodiments of the present disclosure, power-saving features may be triggered when apparatus is within safe zone 310. For instance, the GPS component 350 of the location detection module may be set to a passive detection state so as to save battery power for the apparatus. Accordingly, when it is determined that the apparatus is within an interactive tracking zone, it may not be necessary to continuously allocate resources to the power-intensive location detection module. Alternatively, when the apparatus is outside of safe zone 310, GPS component 350 may be more actively engaged.

From stage 210, where computing device 700 tracks the pet 305's location, method 200 may advance to stage 220 where computing device 700 may receive an indication of an interaction. The indication may be, as mentioned above, a sensing device of the apparatus issuing a signal to the processing unit upon interfacing with an intra-zone interactive element. In turn, the processing unit may communicate an indication of the interaction to network server 110. In this way, network server 110 may receive an indication that the apparatus has interacted with an element within the interactive zone and log the interaction accordingly.

Consistent with some embodiments of the present disclosure, a user may be able to manually register the functionality and location of certain interactive or passive elements within the safe zone/interactive tracking zone. For example, user 105 may input into the platform the location of a food/beverage dispenser. Then, when network server 110 receives a signal (e.g., standard location signal) from the apparatus at the set location, it may be derived by server 110 that pet 305 is either eating or drinking and logged accordingly. In this way, the food/beverage dispenser may not need to be modified for communication with the sensing devices of the apparatus. In other embodiments, and as will be detailed below, a food/beverage dispenser, and other pet-interfacing elements, may be integrated to communicate with the apparatus and the apparatus may, in turn, send a more specific signal of interaction to network server 110.

Still consistent with embodiments of the present disclosure, user 105 may input into the platform labels for passive RFID tags, Bluetooth beacons, or other means of electronic object detection. For illustrative purposes, the description will be written with reference to RFID tags. For instance, a first RFID tag may be registered as a sleep room, while a second RFID tag may be registered as a play room. Then, when server 110 receives a corresponding signal of interaction from the apparatus, it may be derived that pet 305 is either sleeping or playing, and logged accordingly.

Once computing device 700 receives an indication of interaction in stage 220, method 200 may continue to stage 230 where computing device 700 may trigger an action corresponding to the received indication. As mentioned above, a user may be enabled to establish a set of rules for remotely operative certain intra-zone interactive elements.

Figure 5:
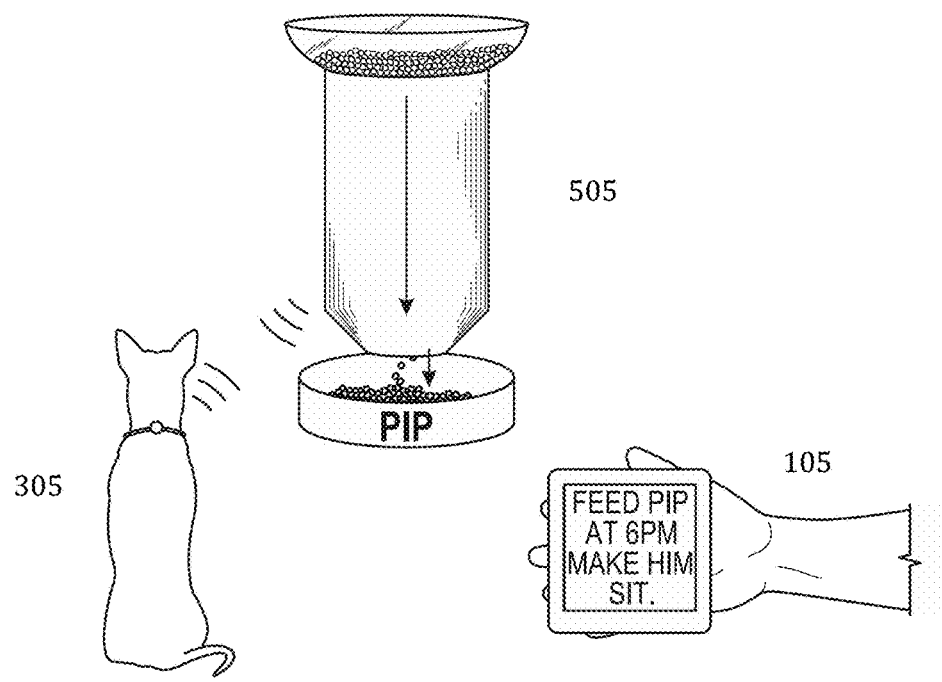
FIGS. 5-6 are diagrams illustrating interactive elements consistent with embodiments of the present disclosure.

By way of non-limiting example, user 105 may be enabled to determine a set of times when his dog, Pip, may be fed, as illustrated in FIG. 5. Thus, when Pip approaches a food dispensing unit that has been integrated with an interactive platform element, a signal from Pip's apparatus may be sent to server 110.

Server 110 may the cross-reference the set of rules and send a signal back to Pip's apparatus. The signal may correspond to a command to dispense food or not to dispense food. In turn, Pip's apparatus may receive the signal and communicate with the interactive food dispensing unit accordingly (e.g., via Bluetooth). In other embodiments, server 110 may be configured to issue the command directly to the interactive intra-zone element (i.e., the food dispensing unit).

Figure 6:
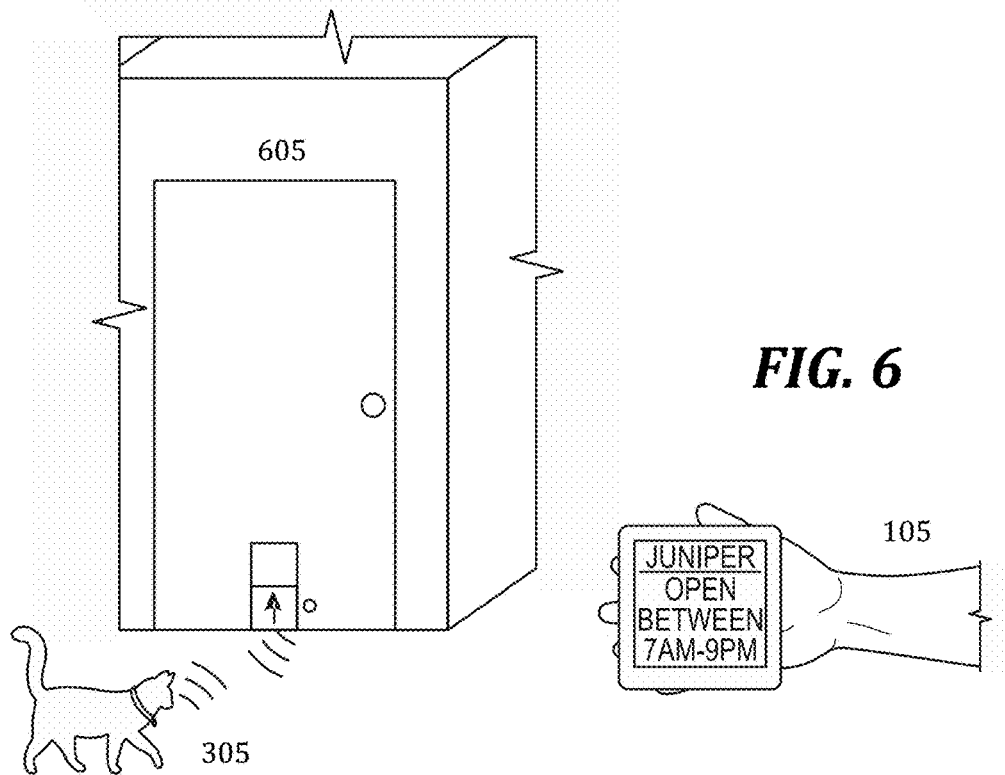

Still consistent with some embodiments, server 110 may issue an alert to user 105 and prompt the user with an option to select an operation of the interactive elements (i.e., to dispense food or not to dispense food). FIG. 6 illustrates a similar operation for the opening of a pet door for a user's cat, Juniper. In this way, user 105 may remotely operate pet-interfacing elements throughout the interactive tracking zones of the present disclosure.

Not shown in the figures, server 110 may be in operative communication with various A/V components such as microphones and cameras positioned throughout the interactive zone. Accordingly, when it is detected that pet 305 has entered, for example, a play room, server 110 may trigger A/V components within the play room to begin recording and transmit an A/V feedback to server 110. Server 110 may record the transmission and store it in a memory storage for later retrieval by user 105. Alternatively, server 110 may provide a live stream of the recordation to user 105 via the UI. In some embodiments, server 110 may issue an alert to user 105 and prompt the user with an option to view the live feed.

After computing device 700 triggering an action in stage 230, method 200 may proceed to stage 240 where computing device 700 may communicate data to user 105. The data may be aggregated over the course of time, and algorithms may be used to determine patterns in pet 305's behavior. For instance, it may be determined where pet 305 spends most of their time, or how often pet 305 uses the bathroom (i.e., urinates and/or has a bowel movement), plays, sleeps, eats, etc. The data may be provided to the user via the UI as, for example, a report that is dynamically updated. In some embodiments, the server 110 may receive rules for providing care for pet 305. For example, rules for providing care may include how often pet 305 should get fed, how much movement pet 305 should have in a day and how often pet 305 should use the bathroom. Based on the rules and the aggregated data, server 110 may provide recommended care for pet 305 (e.g., how far pet 305 should be walked, or whether pet 305 should be fed more or less). In some embodiments, server 110 may provide data to a plurality of users. In further embodiments, server 110 may receive data from each of the plurality of users. The platform may provide the data between users. For example, a user may feed a pet and inform the other users that the pet has been fed via server 110. In such embodiments, each user may receive a push notification when data has been receive by one of the plurality of users. Once computing device 700 provides the data in stage 240, method 200 may then end at stage 250.

IV. Platform Architecture

The interactive tracking, monitoring, and reporting platform for domesticated animals platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the interactive tracking, monitoring, and reporting platform for domesticated animals platform 100 may be hosted on a centralized server, such as, for example, a cloud computing service. Although method 200 has been described to be performed by a computing device 700, it should be understood that, in some embodiments, different operations may be performed by different networked elements in operative communication with computing device 700.

Embodiments of the present disclosure may comprise a system having a memory storage and a processing unit. The processing unit coupled to the memory storage, wherein the processing unit is configured to perform the stages of method 200.

Figure 7:
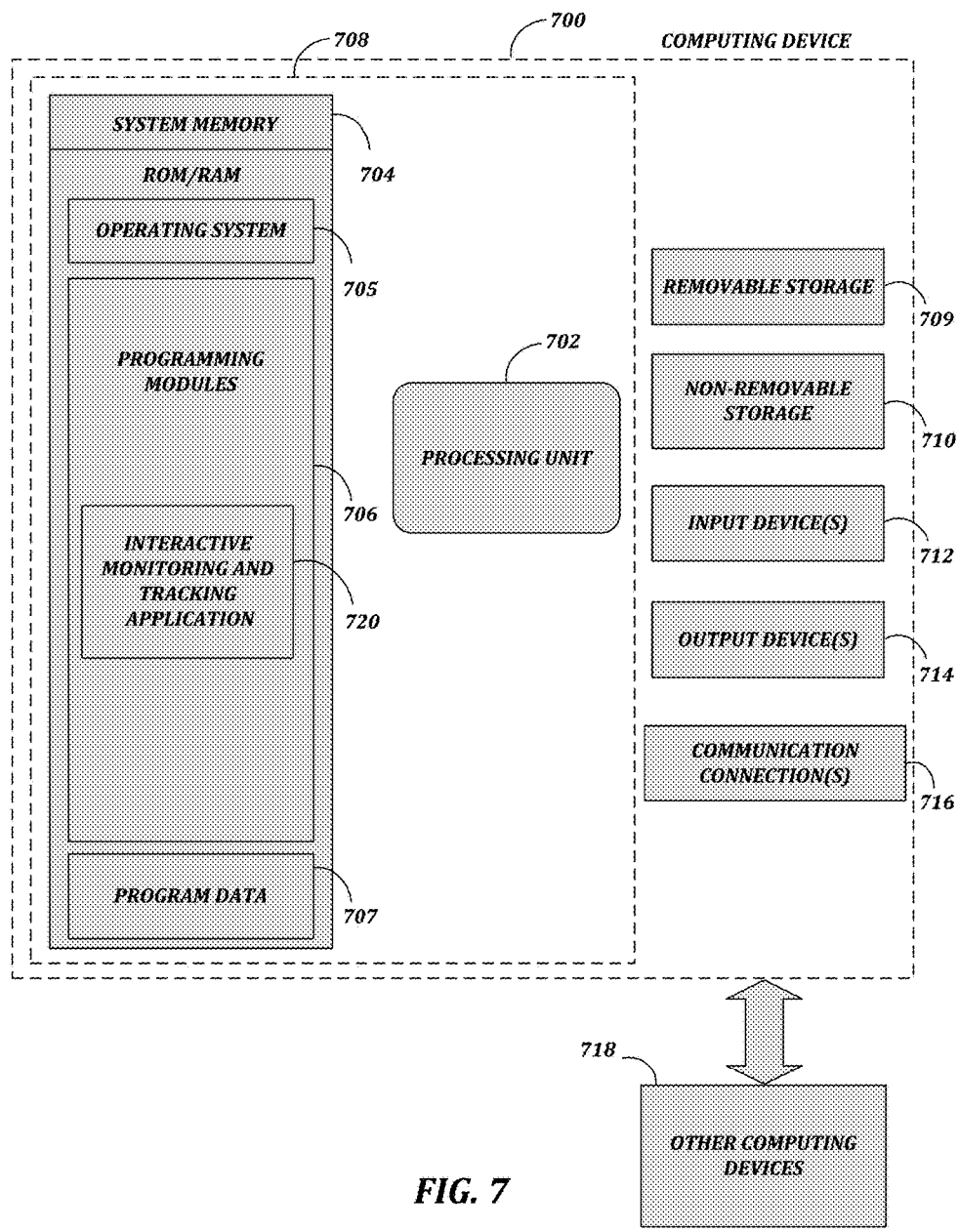
FIG. 7 is a block diagram of a system including a computing device for performing embodiments of the present disclosure.

FIG. 7 is a block diagram of a system including computing device 700. Consistent with an embodiment of the disclosure, the aforementioned memory storage and processing unit may be implemented in a computing device, such as computing device 700 of FIG. 7. Any suitable combination of hardware, software, or firmware may be used to implement the memory storage and processing unit. For example, the memory storage and processing unit may be implemented with computing device 700 or any of other computing devices 718, in combination with computing device 700. The aforementioned system, device, and processors are examples and other systems, devices, and processors may comprise the aforementioned memory storage and processing unit, consistent with embodiments of the disclosure.

With reference to FIG. 7, a system consistent with an embodiment of the disclosure may include a computing device, such as computing device 700. In a basic configuration, computing device 700 may include at least one processing unit 702 and a system memory 704. Depending on the configuration and type of computing device, system memory 704 may comprise, but is not limited to, volatile (e.g. random access memory (RAM)), nonvolatile (e.g. read-only memory (ROM)), flash memory, or any combination. System memory 704 may include operating system 705, one or more programming modules 706, and may include a program data 707. Operating system 705, for example, may be suitable for controlling computing device 700's operation. In one embodiment, programming modules 706 may include interactive application 720. Furthermore, embodiments of the disclosure may be practiced in conjunction with a graphics library, other operating systems, or any other application program and is not limited to any particular application or system. This basic configuration is illustrated in FIG. 7 by those components within a dashed line 708.

Computing device 700 may have additional features or functionality. For example, computing device 700 may also include additional data storage devices (removable and/or non-removable) such as, for example, magnetic disks, optical disks, solid state memory devices, or tape. Such additional storage is illustrated in FIG. 7 by a removable storage 709 and a non-removable storage 710. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also have input device(s) 712 such as a keyboard, a mouse, a pen, a sound input device, a touch input device, etc. Output device(s) 714 such as a display, speakers, a printer, etc. may also be included. The aforementioned devices are examples and others may be used.

Computing device 700 may also contain a communication connection 716 that may allow device 700 to communicate with other computing devices 718, such as over a network in a distributed computing environment, for example, an intranet or the Internet. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 704, including operating system 705. While executing on processing unit 702, programming modules 706 (e.g., interactive application 720) may perform processes including, for example, one or more of method 200's stages as described above. The aforementioned process is an example, and processing unit 702 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method comprising:
    providing a wearable device designed to be attached to a pet;
    receiving at least one rule for tracking a pet via the wearable device, wherein receiving the at least one rule for tracking the pet comprises the following:
        receiving at least one rule for operating at least one network connected device within an interactive tracking zone, wherein the at least one network connected device comprises the following:
            a food dispenser, wherein the food dispenser is configured to interact with the wearable device,
            a door, wherein the door is configured to interact with the wearable device, and
            at least one audio/visual (A/V) device within the interactive zone, wherein the operation of the A/V device is based, at least in part, on a location of the wearable device;
    tracking the wearable device within the interactive tracking zone, the interactive zone comprising the at least one network connected device that is configured to interact with the wearable device;
    receiving an indication of interaction of the wearable device within the interactive tracking zone, wherein receiving the indication of the interaction comprises at least one of the following:
        receiving an indication that the wearable device is within the interactive tracking zone,
        receiving an indication that the wearable device is in proximity to the at least one network connected device, and
        receiving an indication that the wearable device in communication with the at least one network connected device;
    determining, in response to the received indication, whether the interaction satisfies the at least one rule, wherein determining whether the interaction satisfies the at least one rule comprises:
        determining whether a command to operate the at least one network connected device has been received from an operator of the wearable device when the at least one rule is operator-command based,
        determining whether the interaction occurred within a designated time period for operating the at least one network connected device when the at least one rule is time-based, and
        determining whether the interaction occurred within a designed zone for functions associated with the at least one networked connected device when the at least one rule is location based,
    triggering an action in response to a determination that the interaction satisfied the at least one rule, wherein triggering the action comprises:
        actuating the food dispenser when the interaction is associated with the food dispenser,
        actuating the door when the interaction is associated with the door, and
        causing an operation of the at least one A/V device when the at least one A/V device is within the interactive tracking zone; and
    providing a report of the pet's activities based on the interaction of the wearable device with the at least one network connected device.

2. The method of claim 1, providing the report comprises providing a summary of the pet's activities over the course of a time interval.

3. The method of claim 1, wherein providing the report comprises providing a recommended action based on at least one of the following:
    a maximum interval recommended between urinating,
    a maximum interval recommended between bowel movements,
    a maximum interval recommended between eating,
    a minimum interval recommended between eating,
    a minimum amount of movement, and
    a maximum amount of movement.

4. The method of claim 1, wherein determining whether the command to operate the at least one network connected device has been received comprises:
    alerting the operator of the wearable device that the interaction within the interactive tracking zone has been received, and
    enabling the user to select an operation of the at least one network connected device within the interactive tracking zone.

5. The method of claim 1, wherein providing the report of the pet's activities based on the interaction of the wearable device with the at least one network connected device comprises:
    aggregating interactivity data over a period of time, and
    determining patterns based on the aggregated data.

* * * * *